US005291652A

United States Patent [19]

Vossen et al.

[11] Patent Number: 5,291,652

[45] Date of Patent: Mar. 8, 1994

[54] APPARATUS FOR THE PRODUCTION OF A DEVICE FOR DETACHING PORTIONS OF PLATE-LIKE WORKPIECES

[75] Inventors: Franz Vossen, Stockach-Wahlwies; Karl J. Gaigl, Stockach, both of Fed. Rep. of Germany

[73] Assignee: Meurer Nonfood Product GmbH, Radolfzell, Fed. Rep. of Germany

[21] Appl. No.: 895,614

[22] Filed: Jun. 9, 1992

Related U.S. Application Data

[63] Continuation of Ser. No. 665,786, Mar. 7, 1991, Pat. No. 5,152,053, which is a continuation of Ser. No. 257,344, Oct. 13, 1988, abandoned.

[30] Foreign Application Priority Data

Oct. 13, 1987 [DE] Fed. Rep. of Germany ....... 3734553
Mar. 8, 1988 [DE] Fed. Rep. of Germany ....... 3807560

[51] Int. Cl.[5] ......................... B23D 19/00; B31B 1/14

[52] U.S. Cl. ......................................... 29/798; 29/432; 29/809; 29/810; 227/128; 227/136; 493/82; 493/342

[58] Field of Search ......................... 29/432, 798, 809; 76/107 R; 493/82, 83, 342; 227/114, 120, 139

[56] References Cited

U.S. PATENT DOCUMENTS

| | | | |
|---|---|---|---|
| 975,322 | 11/1910 | Brady | 411/448 |
| 2,300,785 | 11/1942 | Haydon | 29/432 |
| 2,342,709 | 11/1944 | Vatet | 411/448 |
| 2,924,863 | 2/1960 | Chavannes | 76/107 R X |
| 3,032,769 | 5/1962 | Palmer | 29/432 |
| 3,334,406 | 8/1967 | Bennett | 76/107 R X |
| 3,556,743 | 1/1971 | Yeager | 29/809 X |
| 3,910,324 | 10/1975 | Nasiatka | 29/809 X |
| 3,915,367 | 10/1975 | Potucek | 227/136 |
| 4,251,017 | 2/1981 | Doyle et al. | 227/136 X |
| 4,536,930 | 8/1985 | Bompard et al. | 29/809 X |
| 4,568,010 | 2/1986 | Dilo | 227/139 X |

*Primary Examiner*—Mark Rosenbaum
*Assistant Examiner*—S. Thomas Hughes
*Attorney, Agent, or Firm*—Bachman & LaPointe

[57] ABSTRACT

An apparatus for the production of a device for detaching portions of a planer workpiece of cardboard used in the folding box industry. The workpiece contains at least one blank for a folding box and adjoining waste pieces which are removed from the plane of the workpiece by the device. The device is formed of a plurality of breaking out pins inserted into a breaking out plate, the pins corresponding in position to the positions of the waste pieces of the blank. The apparatus includes a pressing element for pressing each breaking out pin into the breaking out plate and a magazine device for feeding the pins to the pressing element. A guide piece is associated with the magazine device and the pressing element which acts to guide each pin from the magazine. The guide piece is provided in the feed path of the of the magazine and is provided with a recess for receiving each individual breaking out pin.

29 Claims, 5 Drawing Sheets

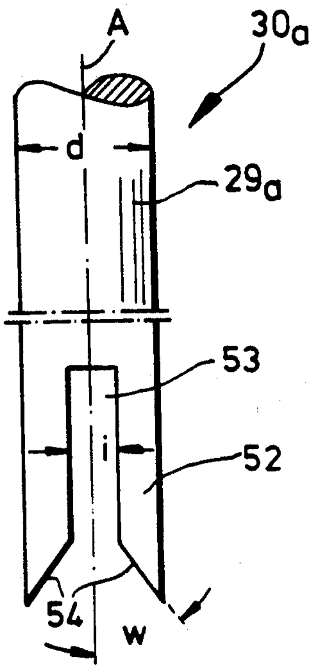
Fig.11
Fig.12
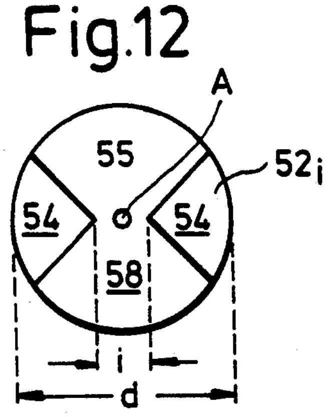
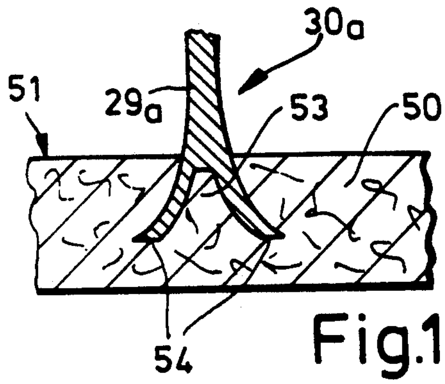
Fig.13
Fig.14
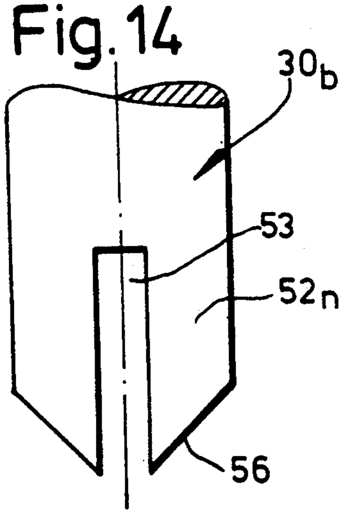
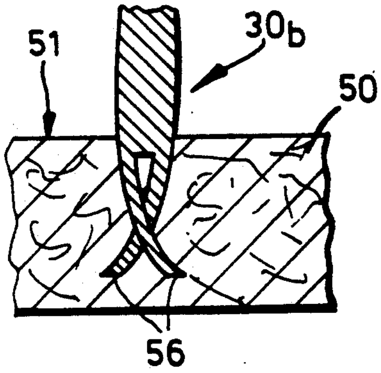
Fig.16
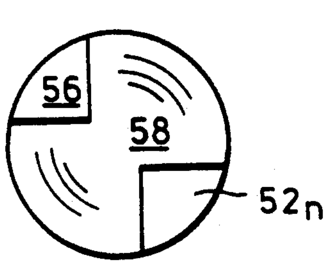
Fig.15
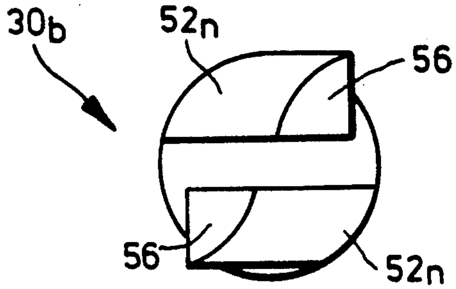
Fig.17

APPARATUS FOR THE PRODUCTION OF A DEVICE FOR DETACHING PORTIONS OF PLATE-LIKE WORKPIECES

This is a continuation of application Ser. No. 665,786 filed Mar. 7, 1991, now U.S. Pat. No. 5,152,053, which is a continuation of application Ser. No. 07/257,344, Oct. 13, 1988, now abandoned.

BACKGROUND OF THE INVENTION

The invention relates to an apparatus and a process for the production of a device for detaching portions from workpieces in plate, sheet or leaf form, in particular sheets of cardboard which are used in folding box industry and which each contain at least one blank for a folding box or the like and adjoining waste pieces, wherein the latter are moved out of the plane of the sheet of cardboard or the like by means of a breaking-out tool.

The production of folding boxes primarily involves dealing with sheet material of cardboard. In an operation which is known as sheet laying-out, depending on the size of the sheet and the folding box, one or more blanks or utilizable portions are produced in the sheet of cardboard or the like. At any event waste areas or waste portions occur, adjoining the blanks and separated therefrom by desired-separation lines. Efforts are made to position the blanks in the sheet laying-out operation relative to each other in such a way that the amount of waste produced is as small as possible; it will be appreciated moreover that the amount of waste produced also differs when dealing with different blanks.

After the sheet laying-out operation, the sheet material is continuously stamped and grooved in an automatic flat stamping apparatus, that is to say, the fold lines, bend lines and desired-separation lines are formed or impressed in the sheet material. The waste is then broken out by means of breaking-out tools which engage the waste portions at both sides thereof by means of pressure elements, which clampingly hold such a waste portion and which for example draw it out of the plane of the sheet of material.

Breaking-out tools of that kind are known for example from German published specification (DE-AS) No 85 759; the waste portion is pushed by means of a plate which is moved perpendicularly thereto, out of the sheet of cardboard on to the head of a stem which is disposed resiliently therebeneath, and is ejected by same. Such a device is comparatively complicated and expensive, especially as a sheet laying-out operation not infrequently necessitates the use of one hundred to two hundred individual breaking-out tools. In addition to that high level of capital investment, there is also the disadvantage that the operation of setting the breaking-out tools on a setting table outside the machine which performs the breaking-out operation is to be considered extremely time-consuming.

Similar disadvantages are suffered in a breaking-out apparatus which has two rollers which rotate on both sides on the sheet of cardboard, one thereof carrying radial breaking-out pins, in accordance with German published specification (DE-AS) No 16 11 617.

In the folding box industry, orders recur frequently so that as many lay-outs as possible are retained in order to avoid incurring long setting-up times. For that purpose, the recurrent orders, breaking-out boards with nails which are driven in by hand have long been used as the breaking-out tool, the breaking-out board being screwed fast to the upper tool frame of the machine. That is a highly inaccurate method which results in frequent disorders in the automatic stamping machine.

Having regard to those factors, the inventor set himself the aim of improving an apparatus of the kind set forth in the opening part of this specification, and ensuring simple and inexpensive breaking-out, with a high-level of operating reliability.

SUMMARY OF THE INVENTION

In order to solve this task, single breaking-out pins are installed in such a way that they can be transmitted from the magazine device into the stroke path of a piston or a similar pressure element, which is situated orthogonally to a break-out plate. It has proved itself especially favorable to loosely install a couple of singular breaking-out pins, with radial distances between them, on a track-like conveyor organ. To this motional path of this conveyor organ the piston is erected parallel to the breaking-out pins and can be brought forward to such a breaking-out pin, whereby the conveyor organ runs between the piston and the breaking-out plate.

For a further device of the invention, the piston is associated to a mouth piece which is further associated to the supply lane of a magazine container which in turn is foreseen with an entrance opening for its breaking-out pins. The mouth-piece illustrates a guide channel for the to be-driven breaking-out pins.

In accordance with the invention, provided for the conveyor member is a guide arrangement by means of which the conveyor member, preferably a magazine strip or belt, can be pivoted out of the path of movement defined by the piston.

The magazine strip therefore brings the breaking-out pins into the path of impact of the piston which releases a respective breaking-out pin from the magazine strip and drives it into the breaking-out plate at a precisely predetermined location. During the striking or driving-in operation, the magazine strip is moved laterally away from the piston. The piston or punch is automatically displaced for that purpose and therewith the above-described parts of the apparatus. In accordance with the invention, the points at which operation is to be effected are automatically controlled by a microprocessor.

In accordance with a further feature of the invention, the strip-like conveyor member is guided in a rail system consisting of preferably two flanking rails and is of a pivotable nature; the rail system is moved laterally away from the breaking-out pin, for removal thereof, with the pin passing through a gap in the rails. The magazine strip which is formed from elastic material is readily curved in that operation.

The magazine strip which is formed in particular from plastic material is provided with lateral clamping members which are described in greater detail in the claims. Each of the clamping members, in the nature of a slotted sleeve, accommodates one of the breaking-out pins. For cost reasons the magazine strip is divided into short portions each for receiving about five to ten breaking-out pins, the connection between two strip portions being made by means of a pivot or hinge, the axis of which is formed by a breaking-out pin, after the removal of which the empty strip portion falls away and no longer interferes in movement of the entire system.

Besides serving as hinge axes, the breaking-out pins also serve for driving the magazine strip; the shanks thereof are entrained by the teeth of a drive gear wheel.

In accordance with the invention, in a first working stroke the piston picks up the shank of the breaking-out pin which is supplied cyclically and which was stopped against an abutment, in a sleeve portion of the piston rod, and holds the pin, possibly assisted by magnetic or spring forces, while the conveyor system consisting of the magazine strip and the rail guide arrangement pivots laterally away. The piston then drives the breaking-out pin automatically into the breaking-out plate at a predetermined point.

For further details, attention is directed to the claims.

The pin setting apparatus according to the invention is screwed to the support of a printing machine and thus forms a unit with the movable support. In that arrangement the breaking-out plate lies on the printing table. There is no longer any need for separate machines, while in comparison with a manual nailing operation, the level of accuracy is higher, with a faster production process.

It is also in accordance with the invention for the pin setting apparatus to be disposed on the support of a movable transverse member which extends over a simple table plate; unlike the above-mentioned situation of fixing it to the printing machine itself, it will be appreciated that it is necessary in this case for the contours of the sheet lay-out to be provided on the breaking-out plate.

When using that hand table or bench, a compass saw may then additionally be provided for producing large openings in the breaking-out plate, in order to counteract the known suction effect as between the table plate and the breaking-out plate.

In accordance with the invention, the breaking-out pins are fixed clampingly in the magazine strip at spacings and substantially paralleled to each other and are guided with the magazine strip into the path of movement of a piston, whereupon a respective breaking-out pin is detached from the magazine strip with the piston and driven with its point into the breakingout plate which extends transversely with respect to the direction of striking movement of the piston. In addition it has been found to be advantageous for the piston to be displaced parallel to its direction of striking movement and/or for it to be guided to a driving-in point by means of a microprocessor. In that case the operation of moving the piston to the driving-in point may possibly be effected prior to the breaking-out pin being removed from the magazine strip.

Also included within the scope of the invention is a breaking-out pin of a particular configuration for which protection is independently claimed; that breaking-out pin is provided with at least one substantially axial blind slot and anchoring fingers which flank the slot, preferably with a pair of anchoring fingers which possibly provide cutter-like front edges. Such a breaking-out pin can be easily driven into the appropriate holding plate and is then fixed therein in an operationally reliable manner.

For that purpose it has been found to be desirable for the anchoring fingers to be provided with sloping surfaces which are inclined at an angle inwardly at the end with respect to the axis of the pin. Instead of such surfaces however, other constructions may also be provided with outwardly inclined clamping surfaces at the front edges. In the first-mentioned case, the anchoring fingers are urged outwardly when the pin is driven in, thus resulting in a V-shaped spread end, while in the other situation the anchoring fingers engage over each other, in which respect additional oppositely disposed inclination which is directed transversely with respect to the sloping surface assists the anchoring fingers in sliding past each other.

In accordance with further features of the invention the cross-section of the anchoring finger is in the form of a segment or a sector of the cross-section of the shank, while in addition the limb surfaces of the anchoring fingers may preferably extend at a spacing relative to the axis of the shank.

The nailing or breaking-out pin according to the invention is generally a cylindrical metal member which is bored into at its end and which is then machined with a countersink. The member is then subjected to a slitting operation at its end. When that nailing pin is driven for example into a wooden board, the shape of the spreading surfaces, as described above, causes the anchoring fingers to slide away outwardly so that the spacing thereof from each other is increased. The material of the support plate or board flows in between the two anchoring fingers until it reaches the deepest part of the slitted configuration; that deepest part acts like a nail head.

It will be appreciated that, in the construction with the spreading surfaces, it is also possible for a cross slitting configuration to be provided in the metal member at the end thereof, thus forming four anchoring fingers; the number of anchoring fingers is limited only by manufacturing considerations.

In other situations of use it may be desirable for the anchoring fingers not to be allowed to spread outwardly in order for example not to increase the amount of space occupied by the breaking-out pin. In that case, in accordance with the invention, instead of the spreading surface on the anchoring fingers, the pin has what are known as clamping surfaces which extend in opposite relationship to the spreading surfaces, that is to say they converse conically from an outside peripheral surface to a longitudinal axis of the nailing pin. That arrangement of clamping surfaces provides that, when the pin is driven for example into a wooden support plate or board, the anchoring fingers are moved towards each other. In order to produce such a clamping action, the anchoring fingers should be capable of sliding past each other. That is ensured in particular when they are of a cross-section in the form of sectors. At any event the clamping surfaces must be arranged to extend towards each other. It is preferred for the anchoring fingers to be arranged in oppositely disposed sectors of a quadrant so that sufficient space for movement remains between them and in addition there is also a sufficiently larger base surface which limits the extent to which the nailing pin is driven in.

BRIEF DESCRIPTION OF THE DRAWINGS

Further features, advantages and details of the invention will be apparent from the following description of preferred embodiments and with reference to the drawings in which:

FIGS. 11-13 are diagrammatic views of an embodiment of a breaking-out pin and use thereof;

FIGS. 14-17 show a further embodiment of a breaking-out pin and use thereof;

DETAILED DESCRIPTION

Figure 1:
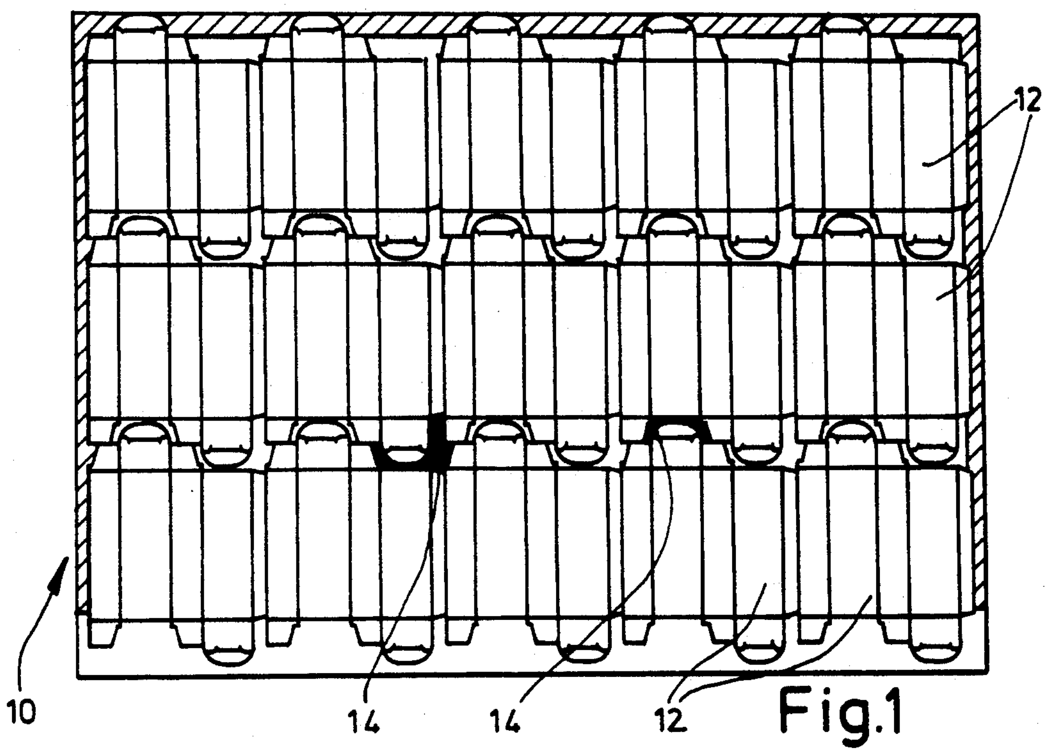
FIG. 1 shows a plan view of a sheet of cardboard.
Figure 2:
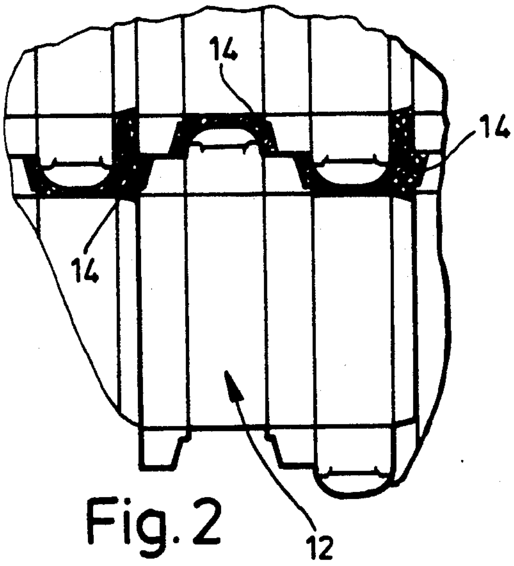
FIG. 2 is a view of a portion from FIG. 1 on an enlarged scale, showing blanks and waste pieces of the sheet of cardboard.
Figure 3:
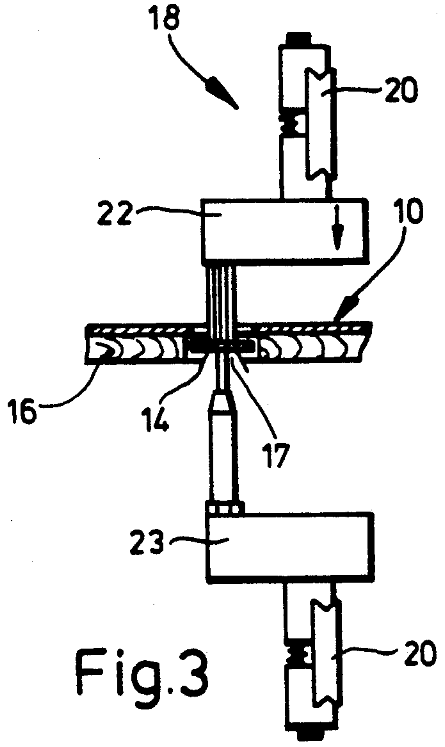
FIG. 3 is a view in section through a part of the sheet of cardboard which is clamped in a tool for breaking out the waste pieces.

FIG. 1 shows a sheet of cardboard 10 which in an automatic flat stamping machine has been provided with continuously stamped or grooved blanks or utilizable portions 12 for the production of flat boxes which are not further shown in the drawings. One of the blanks or utilizable portions 12 is particularly emphasized in FIG. 2, and also waste portions 14 remaining between adjacent blanks 12.

From the automatic flat stamping machine the sheet of cardboard 10 moves on to a holding board 16 of a breaking-out station 18; there, each waste portion 14 is clampingly engaged by an upper breaking-out tool 22 which is held on a clamping bar 20 which is gripped in the frame, and a corresponding lower breaking-out tool 23 which is also held on a carrier bar 20, and the waste portion 14 is broken out through an opening 17 in the holding board 16.

Figure 5:
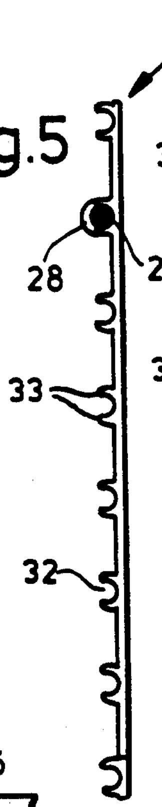
FIG. 5 is a plan view of FIG. 4.
Figure 4:
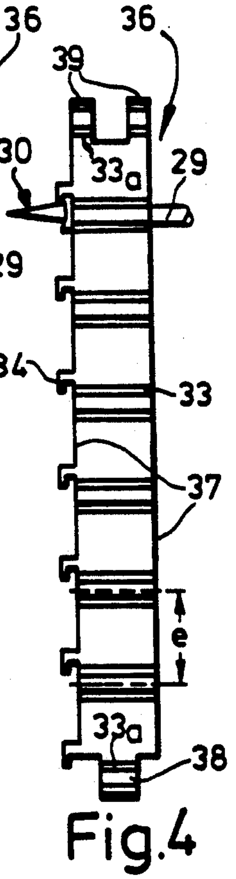
FIG. 4 is a side view of a magazine strip for accommodating breaking-out pins which are to be fitted in a breaking-out plate.
Figure 6:
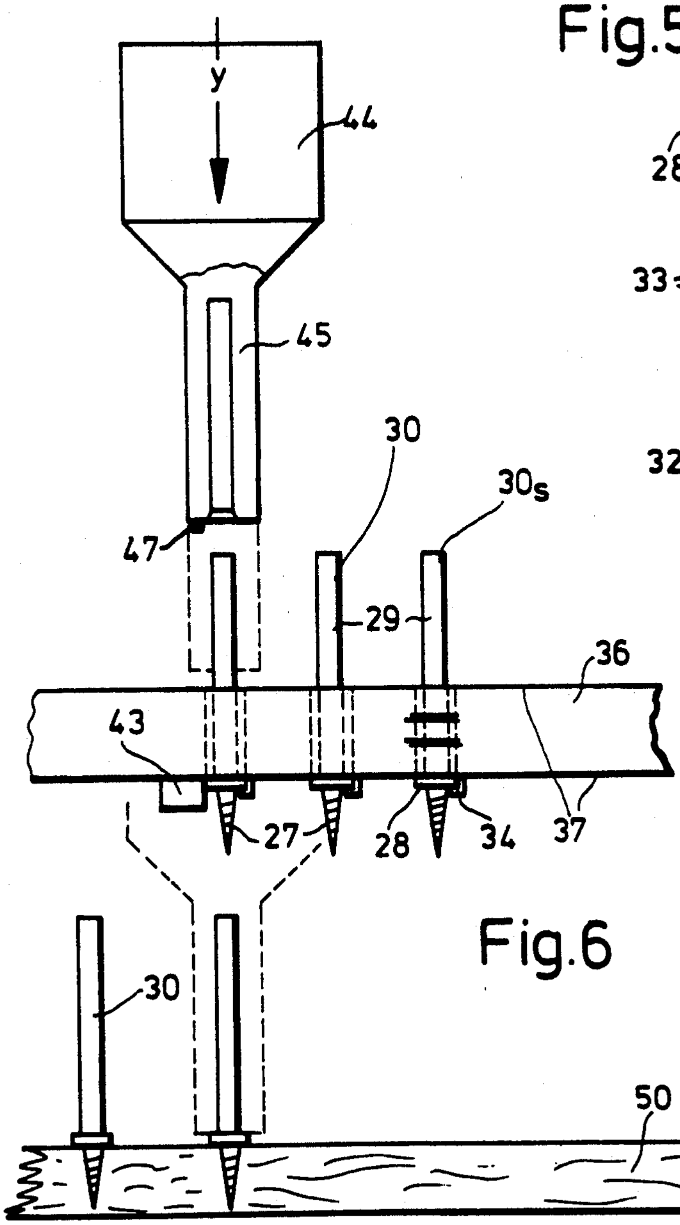
FIG. 6 is a side view of the magazine strip with an associated pressure element of an apparatus, above the breaking-out plate.
Figure 7:
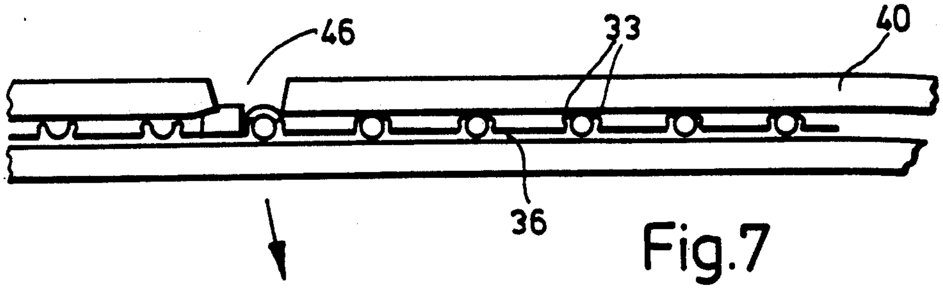
FIG. 7 is a plan view of a part of FIG. 6.

In accordance with the invention the operation of breaking out the waste portions 14 is effected by means of breaking-out pins 30 which, as shown in FIGS. 4 to 6, comprise a shank 29, a radial collar 28 surrounding same and a tip portion 27, and which are clipped into clamping members 32 of a magazine strip 36 of plastic material; each clamping member 32 comprises two gripping ribs 33 which are curved towards each other and which bear against the shank 29 of a respective one of the pins 30, and an associated abutment projection 34 for a collar 28 of the respective pin 30. As shown in FIGS. 4 and 5, the magazine strip 36 is produced in inexpensively short portions which are respectively provided at both ends of the strip with hinge portions which supplement each other, namely a central strip 38 which extends parallel to the edges 37 of the strip on the one hand, and two side strips 39 which cooperate with the strip 38 to form the hinge arrangement. As the strips 39 and the strip 38 are provided with portions 33*a* of a clamping member, one of the breaking-out pins, acting as a hinge axis 30*s*, can connect two of the magazine strips together (see FIG. 6).

The magazine strip 36 with its breaking-out pins 30 which are fitted therein in parallel relationship at spacings e is wound on to a drum (not shown) and is guided by a rail system 40. A toothed wheel 42 transports the magazine strip 36 and therewith the breaking-out pin 30 cyclically into an operating position in contact with an abutment 43 at which the respective breaking-out pin 30 stops.

In that operating position, a piston 44 picks up the breaking-out pin 30, with a sleeve portion 45, in a first downward movement. The pin 30 is now held by a spring or by a magnet 47 (which is not shown for the sake of clarity), disposed outside the sleeve portion 45.

The entire system of the magazine strip 36 now pivots to the side, in which case the pin 30 passes through an opening 46 in the rail system 40 and is drawn out of the magazine strip 36. The piston 44 now has the necessary free space to perform its working stroke and to drive the breaking-out pin 30 or the tip 27 thereof into a breaking-out plate which is indicated at 50. The portions of the magazine strip 36 automatically drop into a collecting box 48 after the hinge axis 30 has been pulled out.

Figure 10:
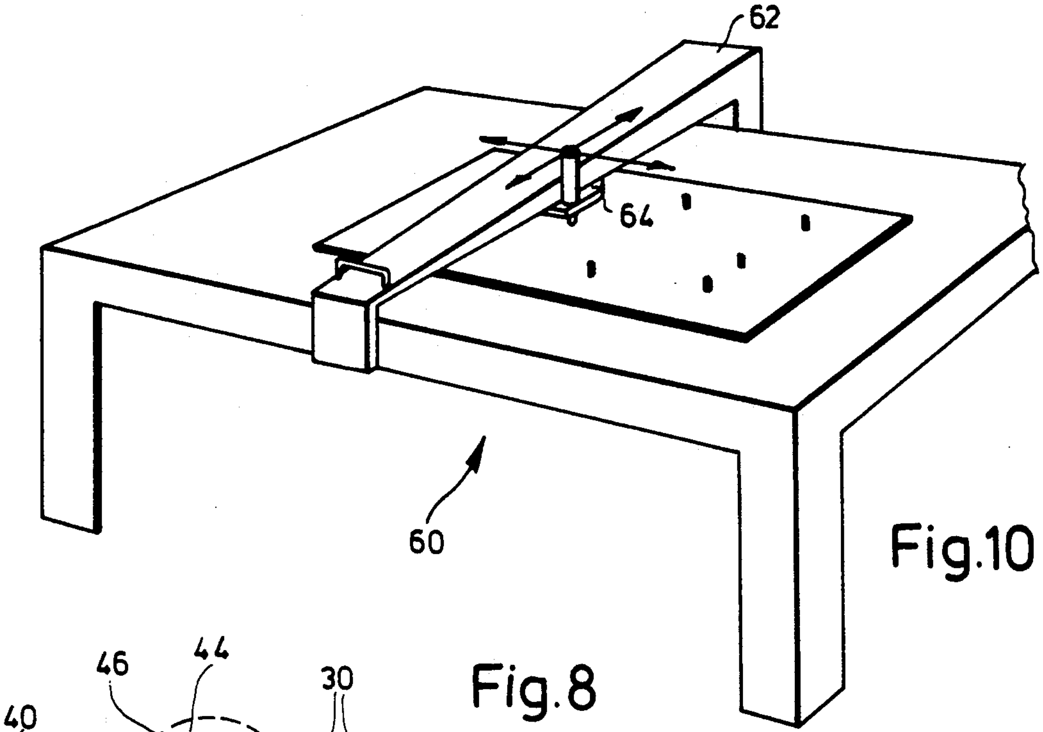
FIG. 10 is a perspective view on to a pin setting table.
Figure 8:
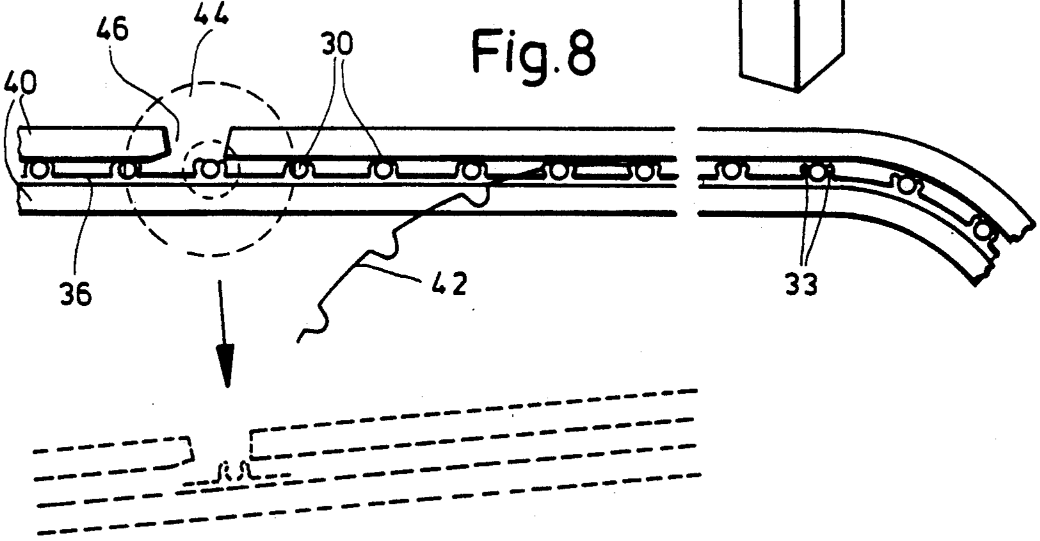
FIG. 8 is a view corresponding to that shown in FIG. 6 of other details of the apparatus.
Figure 9:
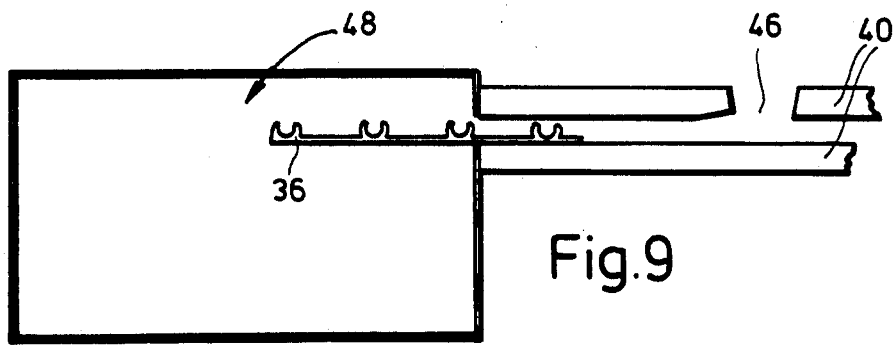
FIG. 9 is a plan view of a further detail of the apparatus.

In the embodiment shown in FIG. 10, the pin setting apparatus described is disposed in a steel table 60 of a simple construction. The steel table 60 can be horizontal or can be inclined so as to result in movement of the piston 44 in a direction. The steel table 60 carries a manually displaceable transverse member 62 with a support 64 which accommodates the pin setting apparatus. For that purpose it is necessary for the contours of the sheet lay-out, for example corresponding to FIG. 1, to be provided on the breaking-out plate 50.

The shank 29*a* of a breaking-out pin 30*a* which is indicated in FIG. 11 comprises a metal member which is for example of circular cross-section, for example a wire portion or a bolt portion. Two prong like extension portions are formed out of the free end of the metal member, to provide anchoring finger 52; a central slit 53 of a width i, about a third of the shank diameter d, separates the two anchoring fingers 52 from each other. The anchoring fingers 52 are of a segment-like cross-section.

The provision of a conical bore surface in the shank 29*a*, prior to the shank being provided with the slit 53, results in sloping surfaces 54 which are inclined inwardly at an angle w on the anchoring fingers 52.

In the embodiment shown in FIG. 12 the cross-sections of the anchoring fingers 52*i* are of a sector-like shape, with the tips of their limb surfaces 55 arranged at a spacing i on both sides of the shank axis A.

When a breaking-out pin 30*a* of that kind is driven into a breaking-out plate 50 or the like carrier plate, material of the breaking-out plate 50 penetrates into the central slit 53 along the surfaces 54 and drives the anchoring fingers 52 outwardly, as shown in FIG. 13.

That therefore results in the breaking-out pin 30*a* being anchored by a barb-like configuration in the breaking-out plate 50 which would be destroyed upon removal of the pin 30*a*. In the case of the breaking-out pin 30*b* shown in FIG. 14, the end surfaces 56 of the anchoring fingers 52*n* are inclined outwardly. During the operation of driving the pin 30*b* in, the anchoring fingers 52*n* slide partly past each other, as shown in FIG. 6, by undergoing bending deformation; that results in a kind of clamping effect or stapling action within the material of the plate.

The end or clamping surfaces 56 are produced in a simple fashion, by the corresponding metal member being conically turned off, ground or milled at its tip. Thereupon the metal material is removed between the two anchoring fingers 52*n* until forming the cross-sectional configuration provided by the two sectors.

The head surface 58 which remains between the pairs of anchoring fingers 52; 52*i*, 52*n* of a breaking-out pin 30; 30*a*, 30*b* acts in relation to the material of the breaking-out plate 50 like a nail head; when the surface 58 encounters the surface 51 of the breaking-out plate 50, the anchoring fingers 52; 52*i*, 52*n* are prevented from being further driven into the breaking-out plate 50, or they can be driven into the plate 50 only by applying a disproportionately high pressure, with corresponding compression of the material.

Figure 18:
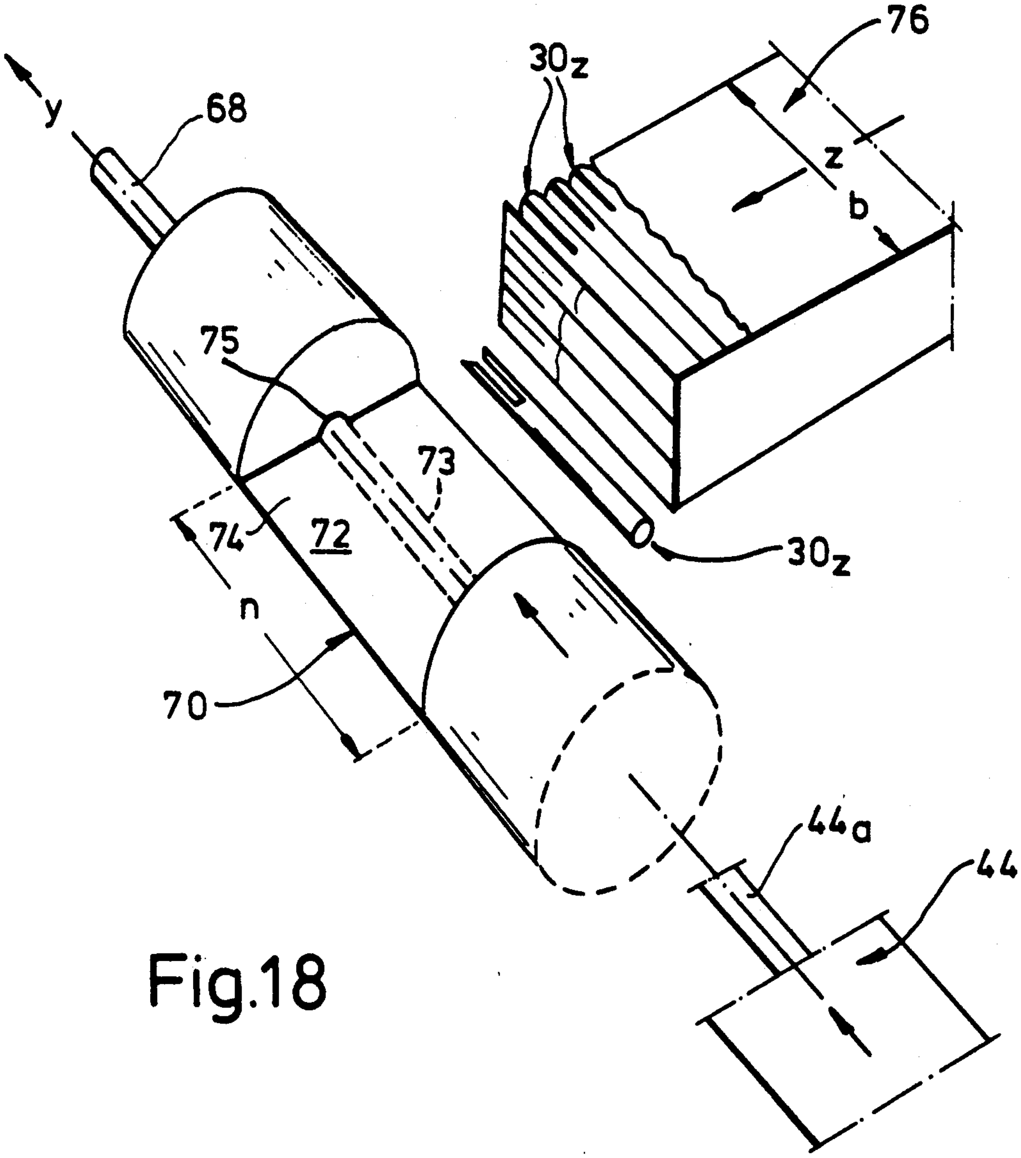
FIG. 18 illustrates a further furnishing device for breaking-out pins.

In another embodiment of the invention the breaking-out pins 30*a* and 30*b*—as well as further constructions of pins—can be driven into a stroke direction y by means of a device as illustrated in FIG. 18. Here, in a bolt-like mouth or guide piece 70, a recess 74 of a semi-circular cross-section and of a length n has been accommodated above a guide surface 72, whereby the recess corresponds to a width b of a box-like pin magazine. This transports singular breaking-out pins, 30*z* onto a guide surface 72 and then presents the resting breaking-out pins, which are situated in a pick-up groove 73, to a guide channel 75. The conveying direction Z of the pin magazine 76 is orthogonal (right-angled) to the stroke direction of a merely indicated piston 44. This piston is further not explained more precisely, as this installation (which corresponds with FIG. 6) the piston 44 drives—when necessary, by means of a pressure-throat 44*a*—the presented breaking-out pin 30*z* in the stroke direction y out of the mouth piece 70, whose frontal stroke support is marked by 68.

It is to be understood that the invention is not limited to the illustration described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An apparatus for producing a device for detaching portions of a substantially planar workpiece having at least one blank in the form of a desired product and adjoining waste pieces and for moving said waste pieces out of a plane of said workpiece, wherein said device includes a breaking-out plate for detaching said portions of said substantially planar workpiece from said waste pieces, said apparatus comprising:

- a breaking-out pin setting device;
- said breaking-out pin setting device comprising a magazine device for containing a plurality of breaking-out pins and means for individually removing said breaking-out pins from said magazine device and for partially inserting said pins in a non-rotatable manner into said breaking-out plate in a desired pattern corresponding to locations of said waste pieces;
- said removing and inserting means comprising a pressure member movable in a direction substantially at a right angle with respect to a surface of said breaking-out plate into which said breaking-out pins are to be inserted;
- said removing and inserting means further including guide means associated with said magazine device and said pressure member for guiding individual breaking-out pins from said magazine device into a pressing path of said pressure member; and
- said guide means having a recess in a feed path of said magazine device for receiving said breaking-out pins.

2. An apparatus according to claim 1, wherein said guide means further includes a guide channel for receiving said individual breaking-out pins in said pressing path of said pressure member.

3. An apparatus according to claim 2, wherein said guide means further includes a channel associated with said recess for receiving said individual breaking-out pins from said magazine device.

4. An apparatus according to claim 3, wherein said channel is arranged in said guide means to guide said individual breaking-out pins into said guide channel.

5. An apparatus according to claim 1, wherein said recess has a length which corresponds to a width of said magazine device.

6. An apparatus according to claim 1, wherein said pressure member includes a hollow sleeve portion directed toward said magazine device for receiving a shank of a breaking-out pin when said pressure member moves in an impact direction toward said magazine device.

7. An apparatus according to claim 1, wherein said pressure member further includes holding means for holding a breaking-out pin, whereby a breaking-out pin is removed from said magazine device and held by said pressure member.

8. An apparatus according to claim 1, further including a support member movably mounted relative to said breaking-out plate, said breaking-out pin setting device being disposed on said support member.

9. An apparatus according to claim 8, wherein said breaking-out pin setting device is associated with a breaking-out plate which is inclined relative to horizontal.

10. An apparatus for the production of a device for separating parts of a laminar, workpiece of cardboard used in the folding box industry, said workpiece containing at least one blank for a folding box and adjoining waste pieces where the waste pieces are removed from a plane of the workpiece by means of said device which comprises a breaking-out tool comprising a breaking-out plate tooled with a plurality of partially inserted breaking-out pins, said apparatus comprising:

- a pressing element movable to and fro relative to a surface of said breaking-out plate;
- a container-shaped magazine device carrying a plurality of individually removable breaking-out pins;
- said magazine device being provided between the pressing element and the breaking-out plate so that the breaking-out pins to be fixed to the breaking-out plate to be tooled are individually transferred from the magazine device into a pressing path of the pressing element;
- a guide piece associated with the container-shaped magazine device and the pressing element, said guide piece acting as a guiding device for each said breaking-out pin; and
- said guiding device being provided in a feed path of the magazine container and being provided with a recess for receiving the breaking-out pins from said magazine device.

11. Apparatus according to claim 10 wherein said guide piece has a guide channel for receiving a respective breaking-out pin dispensed from said magazine device.

12. Apparatus according to claim 11 wherein said guide piece has a second channel for receiving a single breaking-out pin from said magazine device and said recess is aligned with the magazine device.

13. Apparatus according to claim 12 wherein the second channel is arranged in a guide surface and said guide channel in the guide piece is aligned with said second channel.

14. Apparatus according claim 10 wherein the recess has a length (n) which corresponds to a width (b) of the magazine device.

15. Apparatus according to claim 10 further comprising said pressing element having a piston and a sleeve portion directed towards the magazine device for receiving a shank of a respective breaking-out pin when the piston moves in an impact direction towards the magazine device.

16. Apparatus according to claim 15 wherein the respective breaking-out pin is held on the piston by at least one of a magnet and a spring.

17. Apparatus according to claim 10 wherein said apparatus is fitted to a support movable over the breaking-out plate.

18. Apparatus according to claim 10 wherein said apparatus is fixed to a movable support of a printing machine and the breaking-out plate rests opposite it on a printing table.

19. Apparatus according to claim 10 wherein said breaking-out plate is inclined relative to a horizontal axis.

20. Apparatus according to claim 10 wherein:

each said breaking-out pin has a collar on a shank and a tip adjoining the collar.

21. Apparatus according to claim 10 wherein:

said magazine device comprises a container having an entrance opening for said pins; and the pressure member comprises a piston having a mouth piece situated in a supply lane of said magazine container.

22. Apparatus according to claim 21 wherein the mouth piece forms a guide channel for the breaking-out pins.

23. Apparatus according to claim 10 further comprising:

each said breaking-out pin having a substantially axial blind slit and anchoring fingers flanking said slit.

24. Apparatus according to claim 10 further comprising:

each said breaking-out pin being provided with cutter-like front edges.

25. Apparatus according to claim 10 further comprising:

each said breaking-out pin having a pair of anchoring fingers provided with cutter-like front edges.

26. Apparatus according to claim 25 wherein the anchoring fingers are provided at an end of each pin with sloping surfaces which are inclined at an angle inwardly relative to a longitudinal axis (A) of each pin.

27. Apparatus according to claim 25 wherein the anchoring fingers are provided at an end of each pin with clamping surfaces at front edges thereof, said clamping surfaces being inclined at an angle (w) outwardly relative to a longitudinal axis (A) of each pin.

28. Apparatus according to claim 27 wherein a cross-section of each anchoring finger is in the form of a segment or a sector of the cross-section of a shank of the pin and limb surfaces of the anchoring fingers preferably extend at a spacing relative to the axis (a) of the shank.

29. An apparatus for producing a device for detaching portions of a substantially planar workpiece having at least one blank in the form of a desired product and adjoining waste pieces and for moving said waste pieces out of a plane of said workpiece wherein said device includes a breaking-out plate for detaching said portions of said substantially planar workpiece from said waste pieces, said apparatus comprising:

a breaking-out pin setting device;

said breaking-out pin setting device comprising a magazine device containing a plurality of breaking-out pins and means for removing said breaking-out pins from said magazine device and inserting said pins into said breaking-out plate in a desired pattern corresponding to locations of said waste pieces;

said removing and inserting means comprising a pressure member movable in a direction substantially at a right angle with respect to a surface of said breaking-out plate into which said pins are to be inserted; and said pin setting device being fixed to a movable support of a printing machine and the breaking-out plate resting on a printing table in opposite relation thereto.

* * * * *